Patented July 24, 1934

1,967,530

UNITED STATES PATENT OFFICE 1,967,530

METHOD OF PRODUCING CHROMIUM ALLOYS LOW IN CARBON

Ture Robert Haglund, Stockholm, Sweden

No Drawing. Application December 24, 1931, Serial No. 583,151. In Sweden January 3, 1931

9 Claims. (Cl. 75—22.5)

This invention relates to a method of producing chromium alloys low in carbon, such as ferro-chromium, iron and steel alloyed with chromium, etc.

The chief object of the invention is to render it possible to produce chromium alloys low in carbon in one procedure only, in contrast to the ordinary process of first reducing the chromium ore with carbon and then de-carburizing the product thus obtained in a subsequent procedure.

Other objects of the invention will be evident from the following specification and claims.

The invention consists, chiefly, in this, that a slag bath having a melting point not substantially less than 1,750° C. is formed, a material containing carbon is added successively in small portions, for instance, continuously at a controlled rate, directly to the molten surface of said slag-bath, while the latter is being heated so strongly that an essential part of the same is thinly liquid.

By preference, the method is carried out in an electric furnace having electrodes of a large cross section above the surface of the slag-bath so as to heat an essential portion of said bath to a thinly liquid state.

The cross section of the electrodes should, preferably, not be less than 70 dm², the specific load on the electrodes being chosen to a very low average value, i. e. from 4 to 10 kw. per dm² of the cross section of the electrode.

In reducing chromium ore by means of a carbonaceous reducing agent in accordance with this invention the method of charging mentioned above implies the advantage that the reducing carbon and non-melted ore cannot accumulate on the slag bath in any considerable quantity mixed together. On the contrary, before being reduced the chromium oxide is dissolved into the slag bath. The chromium alloy is then produced by the reduction of the molten slag and on account of the high melting point of the slag such reduction is carried out at a considerably higher temperature than in the methods previously used and consequently a chromium alloy low in carbon is formed already at the reduction. Furthermore, the advantage is attained that reduced chromium alloy will not drop down through a layer of carbon in which it is likely to form carbides.

On account of the fact that in accordance with this invention a great portion of the surface of the slag bath is covered by the lower surfaces of the electrodes a considerable portion of the reaction will take place directly below said electrode surfaces. Relatively great quantities of gas are evolved in the narrow space between the slag bath and the lower surfaces of the electrodes on account of the refining of the alloy or on account of the reaction between chromium oxide dissolved in the slag and lumps of coal floating on the slag bath, and under the influence of the electric energy transferred from the electrodes to the slag said development of gas causes a flushing or boiling motion. Said motion is originated on a relatively large surface of the slag bath and propagates further to the surface of the molten slag bath outside the electrodes. Thus, a motion is imparted to the slag bath during the reducing process causing an even distribution of the temperature in the various layers of the slag bath and an even distribution of the chromium oxide dissolved in the same. The even distribution of the temperature in the slag is of great importance for the quiet working of the furnace, because a certain subsequent or after-refining of the alloy is generally brought about by the lower layer of the slag bath in contact with the alloy already reduced. Because such subsequent refining takes place under consumption of heat the slag will easily become viscous in said lower layer, and thus the refining tends to cease periodically. If the upper layer of the slag then is strongly superheated and the temperature is substantially levelled or equalized by conduction of heat and the lower layer of the slag is again heated to such a temperature that the refining is continued the gases developed at the refining will impart a motion to the slag, thus causing superheated slag to be moved downwards into contact with the alloy. Then a violent and almost explosive refining process is initiated, which has a very disturbing influence upon the working of the furnace. On account of the fact that the slag bath is in accordance with this invention subjected to a strong stirring action from above downwards it has turned out that such disturbances of the working of the furnace may be substantially eliminated.

Though an exceptionally low load on the electrodes is used in accordance with the present invention it has turned out, contrary to expectation, that a hotter and more even working of the furnace is attained than in the cases in which the electrodes are operated at a high specific load. If the load is increased to the value otherwise considered as normal, i. e. about 5 to 8 ampères per cm² of the cross section of the electrodes, so violent a motion is imparted to the slag bath that the slag is thrown to the sides because the reaction is concentrated to the surface of the slag bath. Then the slag solidifies outside of the electrodes on account of its high melting point and the furnace becomes obturated and difficult or even impossible to charge. In contrast thereto said inconvenience is eliminated, when the furnace is operated at a lower load on the electrodes and a corresponding increase of the cross section of the electrodes. Very fine results were attained by use of this method for the operation of a three phase electric furnace having electrodes of the Söderberg type, each having a diameter of 1350 mm. and being loaded to about 1 ampère per cm² of the cross-section of the electrodes. The furnace worked well also at a load of only 0,75 ampères per cm², though the yield was then somewhat lower. The current load should not exceed 2 ampères per cm² of the cross section of electrodes.

The composition of the slag and its melting point, which depends upon its composition, is very important for attaining a low percentage of carbon in the alloy. Thus, in producing chromium alloys very low in carbon it proved to be advantageous to work at a temperature of the slag of about 2000° C. or more. But when alloys containing a medium percentage of carbon, such as 2% C., are to be produced by this method slags having a lower melting point—but not considerably lower than 1750° C.—may be used. The reason of using slag of a high melting point in accordance with this method is that the equilibrium between chromium carbide and chromium oxide in the slag is rapidly changed in the direction of de-carbonization when the temperature is raised. The slag should, chiefly, consist of oxides of chromium, aluminium, and magnesium. The other oxides contained in the slag, such as CaO and $SiO_2$ should be regulated by taking the percentage of lime generally not higher than is necessary for desulphurizing the alloy and by maintaining a low percentage of $SiO_2$, said latter percentage being chosen with regard to the composition of the remainder of the slag, because it may otherwise be difficult to get a slag having the desired degree of refractoriness, i. e. the high melting point desired. In the practical use of the invention the percentage of $SiO_2$ of the slag was kept below 15% and as a rule even below 10%. In order to facilitate the refining a high percentage of chromium oxide should be maintained in the slag. As a rule, said percentage should amount to 20 to 40% and in certain cases still more, and the same should, preferably, not be lower than 10%, before the alloy is tapped.

When reducing material containing chromium oxide, such as chromium ore, by use of the method in accordance with this invention the material may either be continuously supplied during the whole melting procedure or the chromium ore may be added at certain intervals only either by supplying the whole quantity of chromium ore during said intervals or by increasing the supply during said intervals to a higher value than in the other periods. To attain a low percentage of carbon in the alloy it has turned out to be advantageous to regulate the periods of charging the ore and the reducing carbon of the charge in relation to each other in such manner that after a portion of the alloy has been tapped off the percentage of chromium oxide in the slag during the reduction of the first portion of the alloy is kept considerably higher than the final percentage of chromium oxide of the slag after the reduction is finished. By supplying, in a subsequent step of the reducing process, more reducing carbon alone or proportionally more carbon than that corresponding to the average proportion between the ore and the reducing carbon the percentage of chromium oxide is lowered to that corresponding to the desired yield of chromium. In this manner the result is attained that the reduction is carried out under conditions considerably more favourable for attaining a low percentage of carbon than those of prior methods. This is due to the fact that the alloy reduced at each moment of time will then have a lower percentage of carbon than that corresponding to the final percentage of chromium oxide in the slag, and particularly the alloy reduced in the first period of time will have a very low percentage of carbon. As an average result an alloy is produced having a percentage of carbon corresponding to a considerably higher percentage of chromium oxide in the finally reduced slag, i. e. by use of this method a good yield and simultaneously a product low in carbon are attained. If slag is tapped off simultaneously or approximately simultaneously with the alloy it is suitable to melt, after such tapping, the whole quantity or a considerable portion of the chromium ore for the charge for the next tapping of alloy before the carbonaceous reducing agent is supplied. Because all the alloy should not be tapped off from the furnace at each tapping operation the metal remaining in the furnace will be refined during such melting down of chromium ore. Particularly if the chromium ore is supplied in such small portions only that the surface of the slag bath is substantially permanently maintained in a rather thinly fluid molten state some of the reducing carbon may, as an alternative, be supplied simultaneously with the chromium ore, for instance, half of the quantity of the reducing agent corresponding to the chromium ore thus supplied, so as to keep the quantities of the slag in the furnace within reasonable limits. During the latter part of the melting period the remaining quantity of carbon and possibly also a minor portion of chromium ore are supplied. If one or more additional tappings of the slag are made between two tappings of metal the percentage of chromium oxide of the remaining slag is raised after each such additional tapping of slag by stopping the addition of reducing carbon entirely or partially at the beginning of the continued supply of charging material. In such cases the method may also be carried out in such manner that the reduction is made more complete before the particular tappings of slag than before the tapping of metal, in order to attain a lower percentage of carbon in the final product. The slag rich in chromium oxide and tapped off at the same time as the alloy may in such cases in well-known manner be more completely reduced in a particular procedure, for instance, for producing a chromium alloy having a high percentage of carbon. If such chromium alloy high in carbon is returned to the process in accordance with this invention, for instance, during a period immediately after metal has been tapped off, said alloy will be refined in respect of its contents of carbon during the course of its melting.

Instead of tapping off the slag simultaneously with the alloy, as stated above, a portion of the finally reduced slag may be tapped off at an earlier moment of time and the remaining slag may be made substantially richer in chromium oxide before the alloy is tapped off, by melting chromium ore while stopping the addition of the carbonaceous reducing agent completely or partially. The percentage of chromium oxide in the slag is then also increased by the reaction of reduced chromium with ferrous oxide contained in the chromium ore. If it is intended to attain a chromium alloy rich in iron it is suitable to supply a greater or minor quantity of an iron-oxygen-compound at the moment of time just mentioned. If metallic iron is also to be supplied in the process such supply may, of course, also be made in other periods of the melting. The slag very rich in chromium oxide effects a very strong refining of the chromium alloy in respect of its percentage of carbon. The slag rich in chromium oxide is left in the furnace when the alloy is tapped off and serves as an initial slag of high percentage of chromium oxide for reducing the first portion of the alloy in the continued process.

In the embodiment of the method just mentioned the slag rich in chromium oxide is preferably given such a composition that its total percentage of oxides of chromium and aluminium exceeds 50%, the percentage of chromium oxide being maintained in excess of 30%. In producing alloys very low in carbon, for instance, alloys having 0,1 to 0,2% of carbon the percentage of chromium oxide of the enriched slag is, by preference, maintained at 40 to 50% or even more. It is advantageous in such cases if the sum of the oxides of aluminium, chromium, and silicium in the slag, calculated in gram-molecules ("mols"), exceeds ¾ or, by preference, the total sum of oxides of magnesium and calcium contained in the slag. In producing alloys having about 1-2% of carbon lower percentages of chromium oxide than those mentioned above may be maintained in the slag rich in chromium oxide. The percentage of chromium oxide of the finally reduced slag may in many cases advantageously be brought down to 10% or even less. But in producing alloys very low in carbon it has, as a rule, turned out to be more advantageous not to carry on the reduction so far, because if the quantity of slag left in the furnace, which is intended to protect the alloy from absorbing carbon from the electrodes, is not too low in chromium oxide it is more easy to increase the contents of chromium oxide in said slag for producing an alloy low in carbon in the continued process. The percentage of silicic acid in the slag rich in chromium oxide is generally kept below 10%, but in the finally reduced slag considerably higher percentages of silicic acid, for instance, up to 15 to 20%, may on the contrary be allowed.

The carbonaceous reducing agent is in accordance with this invention directly supplied to the molten surface layer of the slag bath in the shape of coal in lumps or pieces. It has turned out to be very advantageous to use carbon of low porosity, such as anthracite, remainders of electrodes, and the like. Finely crushed or highly porous reducing carbon is not suitable because too violent a reaction will then take place at the high temperature used for the reduction. The anthracite may preferably be used in a calcined state and in a size like peas or walnuts. The reducing carbon is successively supplied in small portions and as stated above, the supply of the same may in some periods be suppressed or reduced to a lower value in relation to the additions of chromium ore than in other periods. It should be controlled that the reducing carbon is not accumulated in too great quantities on the surface of the slag and that the surface of the slag bath is thinly liquid when the carbon is supplied. If desired, a considerable part of the reduction may in accordance with this invention be effected by the direct reaction of carbon from the lower surfaces of the electrodes with the slag. This effect is brought about by choosing the voltage and the adjustment of the lower surfaces of the electrode or electrodes in relation to the surface of the slag bath in such manner that the slag in its flushing and boiling motion is permanently in contact with the lower surfaces of the electrodes. If the slag bath is kept heated to a temperature at which the speed of the reaction of chromium oxide with carbon is very high it is in certain cases even possible to effect the whole reduction by use of the carbon of the electrodes. As a rule, however, the voltage is in accordance with this invention chosen in such manner that the total consumption of electrode carbon varies from one third of the reducing carbon otherwise supplied up to an equal quantity of electrode carbon and reducing carbon otherwise supplied. By such measures the risk of having the lower portion of the electrode sharpened or pointed by the oxidizing action of the air is eliminated.

In refining a chromium alloy containing carbon, such as ferro-chromium having 6 to 10% C., in accordance with this invention it is advantageous simultaneously to effect a reducing action in the upper surface of the slag bath by means of reducing carbon, such as anthracite or coke, in order to avoid explosive reactions. Then the gases generated at the reduction in the surface layer of the slag bath impart a strong motion to the bath in the manner described above. Because such motion of the slag propagates from the upper hotter surface layer and is rather constant, it aids in equalizing the temperature of the slag bath thus removing the substantial cause of explosive refining procedures. Moreover, it is to be observed that the reduction in the surface layer of the slag bath requires a considerable supply of heat and consequently the time necessary for the refining is considerably lengthened if the supply of energy is maintained substantially constant. The quantities of gas developed at the refining are thus evolved during a considerably longer period of time and consequently the process will have a more quiet course. The alloy to be refined is preferably charged in the first period of time only, for instance the first half of the period between two tappings of metal. The slag may be tapped off immediately before the tapping of metal or at another moment of time. It is preferred to cut off the charging of the furnace during a period of time immediately before the metal is tapped off and to superheat the slag bath only.

In order to facilitate the refining of the reduced metal the partial pressure of the carbon monoxide developed in the reaction should be reduced, at least during a period immediately before the tapping of the alloy, to a considerable degree immediately above at least a part of the molten surface of the slag bath, for instance by combusting said monoxide or by drawing off the same at an accelerated rate. The combustion of the carbon monoxide may then be effected either by air or by pure oxygen. When the method is carried out in an open furnace such combustion may be effected automatically by suitably choosing the distance from the surface of the slag level to the upper edge of the furnace because the carbon monoxide is then combusted immediately at the surface of the slag bath on places outside that part of the liquid slag bath which is covered by the lower surfaces of the electrodes, by means of the natural draught i. e. air is sucked down to the surface of the parts of the molten slag bath which are at some distance from the electrodes, on account of the motion of the gas caused by the concentration of heat to the electrode. The air may, of course, also be supplied by a fan.

A subsequent or after-reduction of chromium oxide immediately before the slag is tapped off may be effected by means of a thermic reducing agent, such as aluminium, silicium, or their alloys.

In order to prevent the chromium alloy from absorbing nitrogen the same may be protected during or after the tapping by any gas free from or poor in nitrogen, such as carbon dioxide, steam, or the like. For the same purpose it is also suitable to cool the alloy quickly after its tapping, for instance, by granulating the same in a water current or by spraying water on the same.

It has often turned out to be difficult to prevent the slag from following the metal when the latter is tapped off. When carrying out the method in accordance with this invention the slag is, preferably, prevented from leaving the furnace by charging a slag-forming material in lumps or gravel like pieces to the portion of the furnace situated in front of the tap hole for the metal, during or before the metal is tapped off, said slag-forming material having a higher specific gravity than the slag. The heavy slag-forming material will then sink down to the layer of slag immediately above the metal and cause the latter to become viscous or to solidify. A suitable material for this purpose is chromium ore.

*Example.*—The operation of an open electric furnace provided with three electrodes of the Söderberg type each having a diameter of 1350 mm. and working with a load per dm$^2$ of their original cross-section not exceeding 10 kw., is started with a refractory slag bath of high chromium oxide content. During the melting operation the surface of the slag bath is kept free from accumulations of molten charging material and the charging material is thrown directly on the surface of the slag bath in such small portions and with such controlled rate that the charged particles float freely on the slag bath during the melting and reduction operations. In this manner the reduction carbon is prevented from reacting with unmolten or partly molten ore and the slag bath is maintained at a high temperature and in a very fluid and reactive condition which cannot be attained if the slag is wholly covered by charging material. During a first period a mixture of chromium ore, a small amount of lime, and anthracite, the latter in surplus compared with the average proportion, is supplied to the furnace. During this period the chromium oxide content of the slag is successively reduced to a lower figure. A considerable part of the slag is now drawn off. During the next period a mixture of chromium ore and a small amount of anthracite and then during a third period a mixture of chromium ore, a small amount of lime, and anthracite, the latter in a quantity less than that corresponding to the average proportion, is supplied to the furnace. The bath is finally superheated whereupon metal is drawn off while the slag, the chromium oxide content of which will have again increased, is left in the furnace to serve as starting slag in the next melting operation.

Throughout this specification and in the annexed claims the term "successively in small portions" is used to indicate that the material is added continuously or at small intervals of time.

What I claim is:—

1. A method of producing chromium alloys low in carbon in an electric furnace, which comprises forming a refractory slag bath consisting chiefly of oxides of chromium, aluminium and magnesium and containing chromium oxide in excess of 20% and less than 15% of silica, distributing the electric current on an essential part of the fluid surface of said slag bath by means of electrodes having an original cross-section not less than 70 dm$^2$ and operated at an average load of less than 10 kw. per dm$^2$ of the original cross section, and adding ferro-chromium rich in carbon successively in small portions directly to the surface of said slag bath.

2. A method of producing chromium alloys low in carbon by refining in an electric furnace a chromium alloy rich in carbon, which comprises forming a fractory slag bath containing chromium oxide in excess of 20% and less than 15% of silica, heating said slag bath to be thinly fluid on an essential part of its surface, and adding the chromium alloy rich in carbon and a carbonaceous material successively and in such regulated portions to the surface of the said slag bath that said carbonaceous material is spread over and floating in the fluid surface of the slag bath without covering more than a part thereof.

3. A method of producing chromium alloys low in carbon in an electric furnace by reducing materials containing chromium oxide with a carbonaceous reducing agent, which comprises forming a strongly heated refractory slag bath containing chromium oxide in excess of 20% and less than 15% of silica, and adding the charging material successively and directly to the fluid surface of said slag bath in such small portions and with such controlled rate that the material containing chromium oxide is prior to its reduction chiefly dissolved in the fluid slag while the carbonaceous reducing agent is spread over and floating on the fluid surface of the slag bath in a quantity insufficient to cover more than a part of said surface.

4. A method of producing chromium alloys low in carbon in an electric furnace by reducing a material containing chromium oxide with a carbonaceous reducing agent, which comprises forming a strongly heated slag bath having a melting point above 1750° C. and consisting mainly of oxides of chromium, aluminium and magnesium and containing less than 15% of silica while the chromium oxide of slag being in excess of 20%, adding the charging material successively and directly to the fluid surface of said slag bath in such small portions and with such controlled rate that the material containing chromium oxide is prior to its reduction chiefly dissolved in the slag while the carbonaceous reducing agent is spread over and floating on the fluid surface of the slag bath in a quantity insufficient to cover more than a part of said surface.

5. A method of producing chromium alloys low in carbon in an electric furnace, which comprises forming a refractory slag bath containing more than 50% of chromium oxide and aluminium oxide taken together and less than 10% of silica, dissolving chromite in said slag bath, and reducing dissolved chromium oxide out of the slag at a temperature of about 2000° C. by means of pieces of a carbonaceous reducing agent added successively in such controlled portions to the surface of fluid slag that said pieces are spread over and freely floating on the fluid surface of the slag bath in a quantity insufficient to cover more than a part of said surface, thus avoiding any substantial reaction between the carbon and undissolved chromium oxide.

6. A method of producing chromium alloys low in carbon in an electric furnace by reducing a material containing chromium oxide, which comprises forming a refractory slag bath containing chromium oxide in excess of 20% and less than 15% of silica and having a melting point above 1750° C., dissolving the material containing chromium oxide in said slag bath, and reducing dissolved chromium oxide out of the slag by means of a carbonaceous material of low porosity added successively in small pieces and in such controlled portions that said pieces are spread over and freely floating on the surface of the fluid slag bath, thus avoiding any substantial reaction between the carbon and undissolved chromium oxide.

7. A method of producing chromium alloys low in carbon in an electric furnace, by reducing a material containing chromium oxide with a carbonaceous reducing agent, which comprises forming a refractory slag bath containing chromium oxide in excess of 20% and less than 15% of silica, supplying at least the reducing agent in small portions to the slag bath, regulating the supplied quantities of the material containing chromium oxide in relation to the supply of reducing agent in such manner that the chromium oxide content of the slag bath is in excess of 30% and the silica content is less than 10% during a period immediately before the produced alloy is tapped off, tapping off an essential portion of the alloy produced while leaving substantially all the slag in the furnace, and then materially lowering the content of chromium oxide of said slag by reduction before the slag is tapped off.

8. A method of producing chromium alloys low in carbon in an electric furnace by reducing a material containing chromium oxide with a carbonaceous reducing agent, which comprises forming a refractory slag bath containing chromium oxide in excess of 20% and less than 10% of silica, distributing the electric current on an essential part of the fluid surface of said slag bath by means of electrodes of an original cross section not less than 70 $dm^2$ and operated at an average load less than 10 kw. per $dm^2$ of their original cross section, and adding the charge to said slag bath successively in such regulated portions that the material containing chromium oxide is prior to its reduction mainly dissolved in the fluid slag bath while the carbonaceous reducing agent without entering to any substantial extent in reaction with undissolved chromium oxide is spread over and floating on the surface of the slag bath in a quantity insufficient to cover more than a part of said surface.

9. A method of producing chromium alloys low in carbon in an electric furnace by reducing a material containing chromium oxide with a carbonaceous reducing agent, which comprises forming a refractory slag bath containing chromium oxide in excess of 20% and less than 15% of silica, distributing the electric current on an essential part of the fluid surface of said slag bath by means of electrodes of an original cross section not less than 70 $dm^2$ and operated at an average load from 4 to 10 kw. per $dm^2$ of their original cross-section, and timing the addition of the charging material in such manner that the chromium oxide is mainly dissolved in the slag bath prior to its reduction and then reduced by the carbonaceous reducing agent spread over and floating on the fluid surface of the slag bath without covering more than a part of said surface.

TURE ROBERT HAGLUND.